(12) United States Patent
Liao

(10) Patent No.: US 12,470,763 B2
(45) Date of Patent: Nov. 11, 2025

(54) VEHICLE-MOUNTED INTERACTION CONTENT CALLING CONTROL METHOD AND STORAGE MEDIUM

(71) Applicant: GUANGZHOU AUTOMOBILE GROUP CO., LTD., Guangdong (CN)

(72) Inventor: Lei Liao, Guangdong (CN)

(73) Assignee: GUANGZHOU AUTOMOBILE GROUP CO., LTD., Guangdong (CN)

( * ) Notice: Subject to any disclaimer, the term of this patent is extended or adjusted under 35 U.S.C. 154(b) by 0 days.

(21) Appl. No.: 18/550,572

(22) PCT Filed: Sep. 26, 2022

(86) PCT No.: PCT/CN2022/121324
§ 371 (c)(1),
(2) Date: Sep. 14, 2023

(87) PCT Pub. No.: WO2023/173719
PCT Pub. Date: Sep. 21, 2023

(65) Prior Publication Data
US 2025/0039490 A1    Jan. 30, 2025

(30) Foreign Application Priority Data
Mar. 15, 2022 (CN) .......................... 202210266090.3

(51) Int. Cl.
*H04N 21/414* (2011.01)
*B60K 35/22* (2024.01)
(Continued)

(52) U.S. Cl.
CPC ....... *H04N 21/41422* (2013.01); *B60K 35/22* (2024.01); *H04L 67/12* (2013.01); *H04N 21/4108* (2013.01)

(58) Field of Classification Search
CPC ......... H04N 21/41422; H04N 21/4108; B60K 35/22; H04L 67/12
(Continued)

(56) References Cited

U.S. PATENT DOCUMENTS 6,426,778 B1 * 7/2002 Valdez, Jr. .............. G06F 16/94
348/478
7,222,155 B1 * 5/2007 Gebhardt ......... H04N 21/26258
709/204

(Continued)

FOREIGN PATENT DOCUMENTS

CN        206465888        9/2017
CN        109445733        3/2019
(Continued)

OTHER PUBLICATIONS

CNIPA, International Search Report for PCT/CN2022/121324, Dec. 22, 2022.
(Continued)

*Primary Examiner* — Tuan C To
(74) *Attorney, Agent, or Firm* — Hodgson Russ LLP

(57) ABSTRACT

A vehicle-mounted interaction content calling control method includes: step S11: the interaction engine receives an interaction content calling request, and queries a corresponding relation between an interaction content stored by the interaction engine and an interaction content calling device in response to the interaction content calling request and according to interaction content ID included in the interaction content calling request to obtain one or more interaction content calling devices corresponding to the interaction content, and an address of the interaction content; and step S12: the interaction engine sends the address of the interaction content to the interaction content calling device for the interaction content calling device to obtain (Continued)

Receiving, by Interaction Engine, Interaction Content Calling Request, and Querying Corresponding Relation between Interaction Content Stored by Interaction Engine and Interaction Content Calling Device in Response to Interaction Content Calling Request and According to Interaction Content ID Included in Interaction Content Calling Request to Obtain One or More Interaction Content Calling Devices Corresponding to Interaction Content, and Address of Interaction Content — S11

Sending, by Interaction Engine, Address of Interaction Content to Interaction Content Calling Device For Interaction Content Calling Device to Obtain and Exhibit Interaction Content According to Address of Interaction Content — S12 and exhibit the interaction content according to the address of the interaction content.

17 Claims, 3 Drawing Sheets

(51) Int. Cl.
  *H04L 67/12* (2022.01)
  *H04N 21/41* (2011.01)
(58) Field of Classification Search
  USPC .......................................................... 701/36
  See application file for complete search history.

(56) References Cited

U.S. PATENT DOCUMENTS

| | | | |
|---|---|---|---|
| 11,019,553 B1 | 5/2021 | Bhambhani et al. | |
| 2007/0088720 A1* | 4/2007 | Neuneier | G06F 16/957 |
| 2015/0100570 A1* | 4/2015 | Zent | G06F 16/334 |
| | | | 707/723 |
| 2017/0272824 A1* | 9/2017 | Bunner | H04N 21/8586 |
| 2017/0351482 A1* | 12/2017 | Niuwenhuys | H04L 67/303 |
| 2021/0224014 A1 | 7/2021 | Cui | |

FOREIGN PATENT DOCUMENTS

| | | |
|---|---|---|
| CN | 109484175 | 3/2019 |
| CN | 112684995 | 4/2021 |
| CN | 113168334 | 7/2021 |
| CN | 113220248 | 8/2021 |
| CN | 113296658 | 8/2021 |
| CN | 113561773 | 10/2021 |

OTHER PUBLICATIONS

Xia, "C-V2X 5G T-Box technical solution," Electronic Technology & Software Engineering, Network Communication Technology, Jun. 2020.

CNIPA, First Office Action for CN Application No. 202210266090.3, Jul. 31, 2025.

* cited by examiner

VEHICLE-MOUNTED INTERACTION CONTENT CALLING CONTROL METHOD AND STORAGE MEDIUM

CROSS-REFERENCE TO RELATED APPLICATIONS

This application is a U.S. national stage entry under 35 U.S.C. § 371 of International Application No. PCT/CN2022/121324, filed Sep. 26, 2022, which claims priority to Chinese Patent Application No. 202210266090.3, filed Mar. 15, 2022, the entire disclosures of which are hereby incorporated herein by reference.

FIELD OF TECHNOLOGY

The present disclosure belongs to the technical field of intelligent connected vehicles, and in particular, relates to a vehicle-mounted interaction content calling control method and system, an interaction engine, and a computer-readable storage medium.

BACKGROUND

At present, there are more and more interaction devices and more and more complex interaction modes in the human-vehicle interaction of automobiles. The interaction content that is provided by automobiles to drivers and passengers relates to a content provider and a content exhibitor, which is usually divided into three situations: (1) automobile state information generated in the automobile running process, including bus information and events, where the content provider is each part of the automobile; (2) prompt information to drivers and passengers generated in the automobile running process, where the content provider is each part of the automobile; and (3) information from a third party software application or a third party information source, where the content provider is the third party software application or the third party information source. The above information may be in the form of text, picture, audio or video. Usually, in the human-vehicle interaction process, an interaction device and the interaction content are highly coupled, the content provider and the exhibitor are bound, and this binding relation is recorded in software inside the content provider and the content exhibitor. If it is necessary to exhibit the interaction content on more devices, or to change the type of an exhibiting device, all involved devices require software modification. For example, vehicle infotainment (AVNT or IVI) serves as an interaction content exhibiting device, application software (such as tire pressure detection) running on the vehicle infotainment is an interaction content provider, and the tire pressure detection result is the interaction content.

SUMMARY

There are provided a vehicle-mounted interaction content calling control method and system, an interaction engine, and a computer-readable storage medium. The technical solution is as below:

According to a first aspect of embodiments of the present disclosure, there is provided a vehicle-mounted interaction content calling control method, including:
Step S11: receiving, by an interaction engine, an interaction content calling request, and querying a corresponding relation between an interaction content stored by the interaction engine and an interaction content calling device in response to the interaction content calling request and according to interaction content ID included in the interaction content calling request to obtain one or more interaction content calling devices corresponding to the interaction content, and an address of the interaction content; and
Step S12: sending, by the interaction engine, the address of the interaction content to the interaction content calling device for the interaction content calling device to obtain and exhibit the interaction content according to the address of the interaction content.

According to a second aspect of embodiments of the present disclosure, there is provided an interaction engine, where the interaction engine is configured to perform the vehicle-mounted interaction content calling control method.

According to a third aspect of embodiments of the present disclosure, there is provided a vehicle-mounted interaction content calling control method, including:
Step S21: receiving, by an interaction engine, an interaction content calling request, and querying a corresponding relation between an interaction content stored by the interaction engine and an interaction content calling device in response to the interaction content calling request and according to interaction content ID included in the interaction content calling request to obtain one or more interaction content calling devices corresponding to the interaction content, and an address of the interaction content;
Step S22: sending, by the interaction engine, the address of the interaction content to the interaction content calling device; and
Step S23: sending, by the interaction content calling device, a request for calling interaction content to a device providing the interaction content according to the address of the interaction content, and exhibiting the interaction content after obtaining the interaction content.

According to a fourth aspect of embodiments of the present disclosure, there is provided a vehicle-mounted interaction content calling control system, including: an interaction engine and an interaction content calling device, where the interaction engine is configured to: receive an interaction content calling request, and query a corresponding relation between an interaction content stored by interaction engine and an interaction content calling device in response to the interaction content calling request and according to interaction content ID included in the interaction content calling request to obtain one or more interaction content calling devices corresponding to the interaction content, and an address of the interaction content, and to send the address of the interaction content to the interaction content calling device; and
the interaction content calling device is configured to send a request for calling interaction content to a device providing the interaction content used according to the address of the interaction content, and to exhibit the interaction contact after obtaining the interaction content.

According to a fifth aspect of the embodiment of the present disclosure, there is provided a computer-readable storage medium. The computer-readable storage medium includes a stored computer program, where when running, the computer program controls a device where the computer-readable storage medium is located to perform the vehicle-mounted interaction content calling control method.

BRIEF DESCRIPTION OF THE DRAWINGS

To describe the technical solutions in the embodiments of the present disclosure, the following briefly describes the accompanying drawings required for describing the embodiments. Apparently, the accompanying drawings in the following description show some embodiments of the present disclosure, and a person of ordinary skill in the art may still derive other drawings from these accompanying drawings without creative efforts.

DETAILED DESCRIPTION OF THE EMBODIMENTS

The following description of each embodiment refers to the accompanying drawings for illustrating specific embodiments in which the present disclosure can be implemented.

Figure 1:
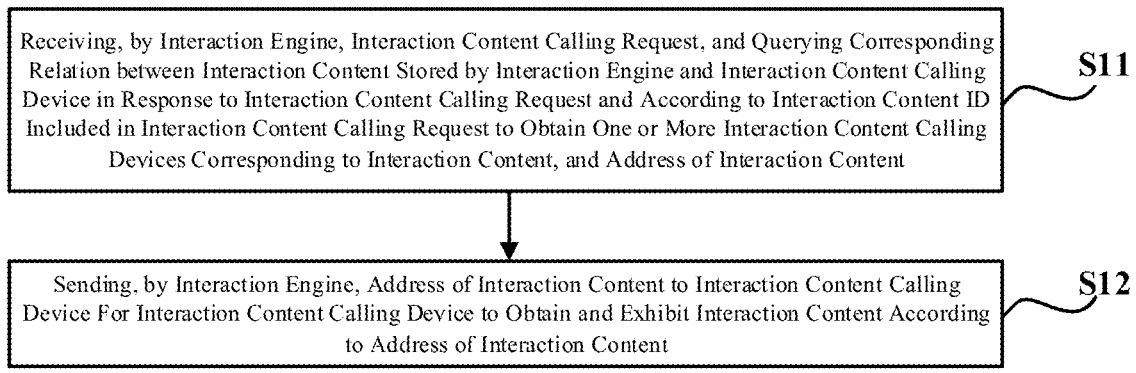
FIG. 1 is a schematic flowchart of a vehicle-mounted interaction content calling control method according to an embodiment of the present disclosure.

Referring to FIG. 1, Embodiment 1 of the present disclosure provides a vehicle-mounted interaction content calling control method, including:

Step S11: an interaction engine receives an interaction content calling request, and queries a corresponding relation between an interaction content stored by the interaction engine and an interaction content calling device in response to the interaction content calling request and according to interaction content ID included in the interaction content calling request to obtain one or more interaction content calling devices corresponding to the interaction content, and an address of the interaction content; and Step S12: the interaction engine sends the address of the interaction content to the interaction content calling device for the interaction content calling device to obtain and exhibit the interaction content according to the address of the interaction content.

Figure 2:
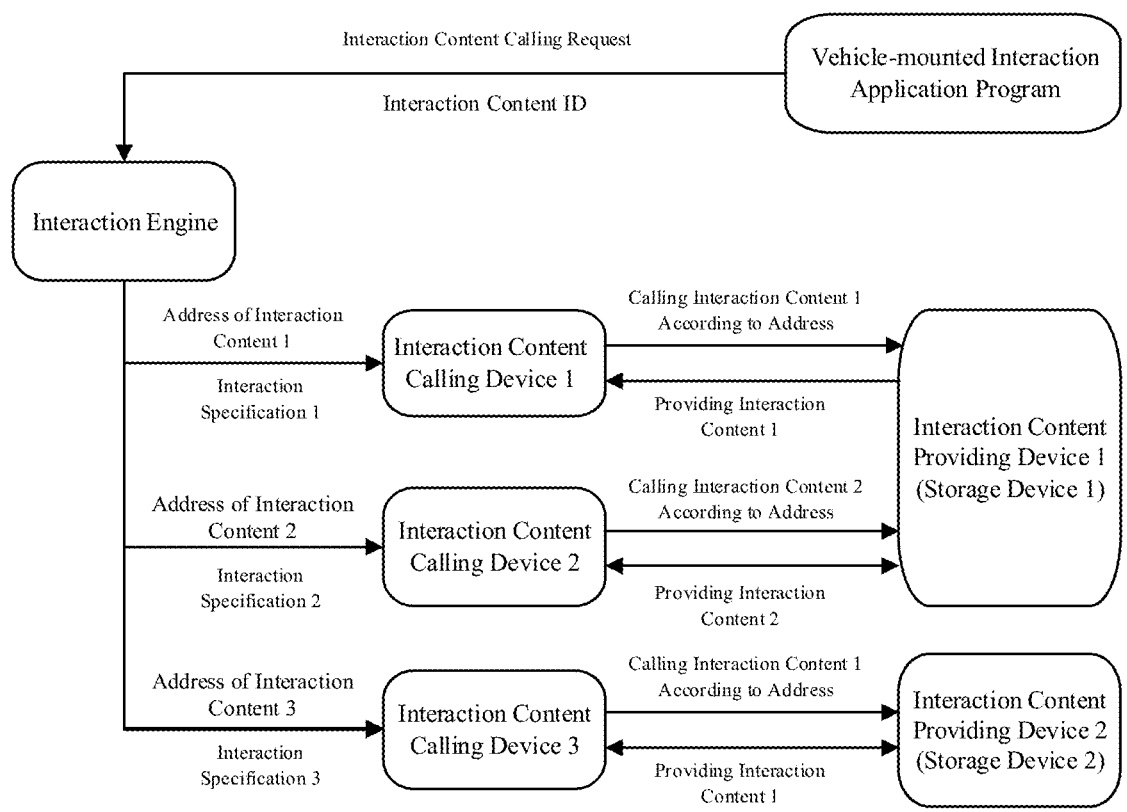
FIG. 2 is a logical architecture schematic diagram of a vehicle-mounted interaction content calling control method according to an embodiment of the present disclosure.

Referring to FIG. 2, it can be seen that the vehicle-mounted interaction content calling control method provided by the present disclosure may rapidly call the interaction content among a plurality of interaction devices, and the calling work is completed by the interaction engine. The interaction engine records a distribution or sharing relation of different interaction contents in different interaction devices, that is, a corresponding relation between the interaction content and the interaction content calling device. When interaction is required, an interaction content calling request is sent by a preset vehicle-mounted interaction application program to call the interaction engine, the interaction engine sends the address of the interaction content to the interaction content calling device corresponding to the interaction content according to the own record, and the interaction content calling device obtains and exhibits the interaction content according to the address of the interaction content. For example, in terms of navigation picture calling, when interaction is required and the navigation picture is exhibited to an instrument from a central control, the interaction content calling request is sent by the preset vehicle-mounted interaction application program to call the interaction engine, where the interaction content calling request includes navigation picture ID (the navigation picture is the interaction content); the interaction engine queries a corresponding relation between the navigation picture stored by the interaction engine and a navigation picture calling device according to the navigation picture ID, for example, navigation picture-instrument, so that the calling device-instrument for exhibiting the navigation picture, and the address of the navigation picture (for example, navigation software running in the central control) are obtained; and then the interaction engine sends the address of the navigation picture to the instrument for the instrument to obtain and exhibit the navigation picture according to the address of the navigation picture. On one hand, according to the present disclosure, the interaction content provider and the interaction content caller are decoupled through the design of the interaction engine, separate software development at the instrument side is not required, and the interaction engine can know the place-instrument where the navigation picture is exhibited according to the corresponding relation as long as the interaction engine stores the corresponding relation between the navigation picture and the instrument, so that the address of the navigation picture is sent to the instrument, and it is convenient for the instrument to grab the navigation picture accordingly; and on the other hand, the central control providing the navigation picture does not need to actively participate in the calling process, and provides the navigation picture to the instrument only when the instrument initiates a request according to the address of the navigation picture.

It should be noted that in this embodiment, the calling of the interaction engine is also decoupled with the interaction content calling device, that is, the calling of the interaction engine is triggered by the present vehicle-mounted interaction application program instead of a specific interaction content calling device. The vehicle-mounted interaction application programs generally refer to all vehicle-mounted software that needs to interact with users, some of which are pre-installed, and some of which are post-OTA. A calling relation is present between the vehicle-mounted interaction application program and the interaction engine. Various vehicle-mounted interaction application programs have been widely used to meet various vehicle-mounted interaction requirements of users. It may be understood that the specific design and service logic of the vehicle-mounted interaction application program belong to the settings of related manufacturers, are not within the improvement scope of the present disclosure and are not limited by the present disclosure as long as the interaction engine can be called through the vehicle-mounted interaction application program when users need to perform interaction. If a plurality of vehicle-mounted interaction application programs are present, when the calling of the interaction engine is triggered, the interaction content calling request will further include ID of the vehicle-mounted interaction program perform triggering so as to be different from other vehicle-mounted interaction application programs.

The interaction content ID in Step S11 refers to a mark for identifying the interaction content in the vehicle-mounted environment. In the vehicle-mounted environment, each determined interaction content owns a unique ID to be different from other interaction contents.

As mentioned above, the interaction engine stores the corresponding relation between the interaction content and the interaction content calling device, and the address of the interaction content. The corresponding relation may be one-to-many, for example, the same interaction content may be exhibited by a plurality of interaction content calling devices; and the corresponding relation may be many-to-one, for example, a plurality of interaction contents may be exhibited by the same interaction content calling device. Through the design of the corresponding relation, the interaction engine may decouple the interaction content provider and the interaction content caller, thereby reducing, even avoiding the software development workload or the changing workload of the interaction content provider and the interaction content caller.

In this embodiment, the interaction engine stores the corresponding relation between the interaction content and the interaction content calling device by a script file. The script file may be designed and modified at any stage of a vehicle life cycle, tools for designing and modifying the script file are deployed at the cloud, that is, the cloud provides an IDE environment for editing the script file, and the edited script file may be sent to the interaction engine through a communication link of the vehicle cloud. The mechanism for adjusting the corresponding relation between the interaction content and the interaction content calling device by modifying the script file may bring the following effects: in the whole vehicle development stage, interaction development may be rapidly completed by modifying the script file, so that different vehicle models may rapidly form completely different interaction styles; in the vehicle use stage, a main engine plant may also rapidly change the interaction mode of vehicles by changing the script file; and in the vehicle use stage, users may modify the interaction mode within the scope authorized by the main engine plant. Taking an interaction scenario displayed by the tire pressure as an example, if a tire pressure display function is not installed in the instrument in advance, tire pressure data cannot be displayed in the instrument temporarily (at this time, in the corresponding relation between the tire pressure data recorded by the interaction engine and the tire pressure data calling device, the tire pressure data calling device obviously does not include the instrument). After the tire pressure display function is installed at the instrument side through OTA, the original script file may be modified at the cloud, and the instrument is added into the corresponding relation between the tire pressure data and the tire pressure data calling device; and then a new script file is sent to the interaction engine through the communication link of the vehicle cloud. Then, if there is an interaction requirement to display the tire pressure data to the instrument, the interaction engine is called, the interaction engine queries the corresponding relation between the tire pressure data and the tire pressure data calling device and finds the tire pressure data caller-instrument, and then the interaction engine sends the address of the tire pressure data to the instrument for the instrument to obtain the tire pressure data according to the address and exhibit the tire data on the instrument.

The address of the interaction content refers to an address where the interaction content is stored or an address of a device providing the interaction content in a vehicle-mounted environment. The address of the interaction content may be a network segment address assigned in a CAN network, or may be a network segment address of Ethernet. These addresses may direct to a media device, such as a camera, or may direct to a special media storage device. It may be understood that when a certain device provides a variety of interaction contents, it is also necessary to add an extended address on the device address to form the address of the interaction content.

In addition to storing the address of the corresponding relation and the address of the interaction content, the interaction engine further stores third information-interaction specification. The interaction specification is specifically a standard that specifies how the interaction content is exhibited on the interaction content calling device. The interaction specification includes but is not limited to color, shape, font, size, location, resolution or code rate of video or audio, and the like involved in the interaction content. The same interaction content may be exhibited by different interaction specifications due to different interaction content calling devices, or may be different according to different interaction content providing devices. Different types of interaction contents have basically different interaction specifications. In this embodiment, the interaction content and the type of the interaction content calling device are synthesized to set the interaction specification. When the interaction engine queries the corresponding relation between the interaction content stored by the interaction engine and the interaction content calling device, the interaction engine may obtain the interaction specification for the interaction content calling device to exhibit the interaction content in addition to obtaining the interaction content calling device corresponding to the interaction content.

Therefore, Step S11 further includes: the interaction engine obtains the interaction specification for the interaction content calling device to exhibit the interaction content; and Step S12 further includes: the interaction engine sends the interaction specification to the interaction content calling device for the interaction content calling device to exhibit the interaction content according to the interaction specification after obtaining the interaction content.

Taking an interaction scenario of displaying a reversing image to a rear display screen as an example, it may be understood that the reversing image generated by a camera system during reversing is generally exhibited in a central control display screen; when an interaction requirement of displaying the reversing image to the rear display screen is generated, the calling of the interaction engine is triggered, and the interaction engine queries a corresponding relation between the reversing image stored by the interaction engine and a reversing image calling device according to the reversing image ID (supposing that the corresponding relation between the reversing image stored by the interaction engine and the calling device has been added to the rear display screen by modifying the script file) to obtain the calling device for exhibiting the reversing image-rear display screen, and the address of the reversing image. Since the size, shape and resolution of the rear display screen are not inconsistent with those of the central control display screen, the reversing images that can be suitable for being displayed in the central control display screen are not certainly suitable for being displayed in the rear display screen; therefore, this adaptation problem can be solved by designing a corresponding interaction specification (for example, changing the shape and resolution of the reversing image). The interaction engine synchronously sends the interaction specification to the rear display screen, and the reversing image is exhibited according to the interaction specification after the rear display screen obtains the reversing image according to the address of the reversing image.

When the address of the interaction content is not enough to determine the specific range of the interaction content, the use range of the interaction content may be further clarified by adding an interaction content parameter in the interaction specification, for example, a video stream is intercepted by a length of a time period. Actually, the interaction specifications are all parametric in nature, and may further include parameters for users to perform personalized customization or determined by the vehicle-mounted interaction application program according to the own service logic in addition to the parameters fixed by the main engine plant authority for embodying the brand characteristics. That is, the interaction engine further stores a personalized customization parameter for a user to customize how to exhibit the interaction content, or for a vehicle-mounted interaction application program to determine how to exhibit the interaction content according to the own service logic. For example, user-defined signatures or phrases are set in the interaction specification for the interaction content calling device to, for example, display at the same time when images or videos are exhibited.

The interaction specification may also set priority levels of different interaction contents. After the interaction content calling device obtains the to-be-exhibited interaction content, the interaction content with a higher priority level is preferentially exhibited based on comparison between the priority level configured by the interaction specification and the priority level of the currently exhibited interaction content. For example, a vehicle-mounted media apparatus is currently playing entertainment audio. If the calling of the interaction engine is triggered due to the interaction requirement for exhibiting navigation audio on the vehicle-mounted media apparatus, according to the above process, after the vehicle-mounted media apparatus acquires the navigation audio, the priority level of the navigation audio set according to the interaction specification is compared with the priority level of the currently played entertainment audio. If the priority level of the navigation audio is higher than that of the entertainment audio, the navigation audio is preferentially played.

Corresponding to the vehicle-mounted interaction content calling control method provided by Embodiment 1 of the present disclosure, an interaction engine provided by Embodiment 2 of the present disclosure is configured to perform the vehicle-mounted interaction content calling control method.

Figure 3:
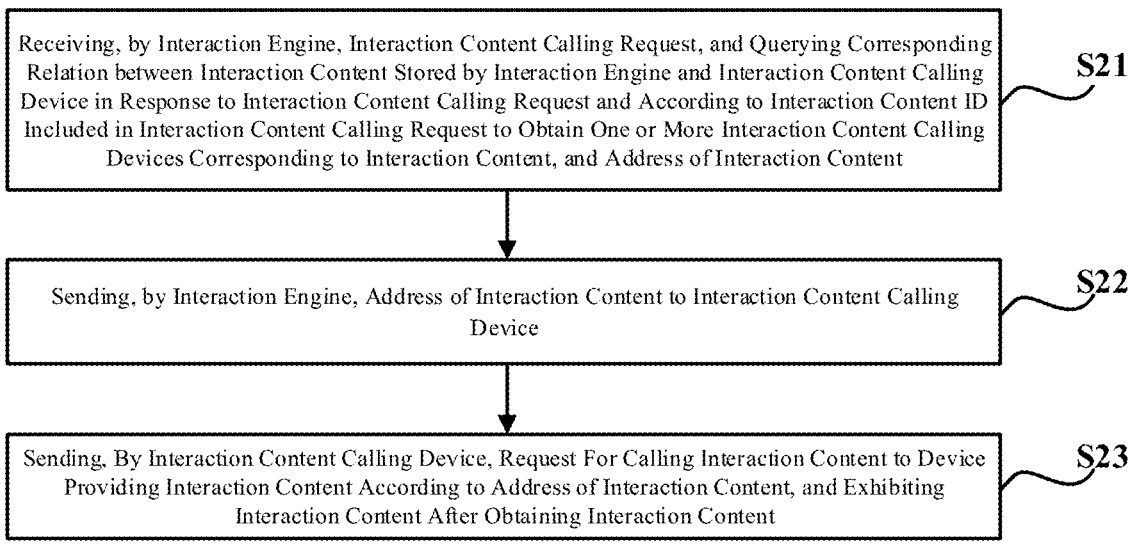
FIG. 3 is another schematic flowchart of a vehicle-mounted interaction content calling control method according to an embodiment of the present disclosure.

Referring to FIG. 3, Embodiment 3 of the present disclosure provides a vehicle-mounted interaction content calling control method, including:

Step S21: an interaction engine receives an interaction content calling request, and queries a corresponding relation between an interaction content stored by the interaction engine and an interaction content calling device in response to the interaction content calling request and according to interaction content ID included in the interaction content calling request to obtain one or more interaction content calling devices corresponding to the interaction content, and an address of the interaction content;

Step S22: the interaction engine sends the address of the interaction content to the interaction content calling device; and Step S23: sending, by the interaction content calling device, a request for calling interaction content to a device providing the interaction content according to the address of the interaction content, and exhibiting the interaction content after obtaining the interaction content.

Further, the interaction engine records and modifies the corresponding relation between the interaction content and the interaction content calling device through an editable script file, and the script file is sent to the interaction engine through a communication link of vehicle cloud after being edited in the cloud.

Further, the address of the interaction content refers to an address where the interaction content is stored or an address of a device providing the interaction content in a vehicle-mounted environment.

Further, the interaction engine further stores an interaction specification, and the interaction specification is specifically a standard that specifies how the interaction content is exhibited on the interaction content calling device.

Further, Step S21 further includes: the interaction engine obtains the interaction specification for the interaction content calling device to exhibit the interaction content; and Step S22 further includes: the interaction engine sends the interaction specification to the interaction content calling device; and Step S23 further comprises: the interaction content calling device exhibits the interaction content according to the interaction specification after obtaining the interaction content.

Refer to the description of Embodiment 1 of the present disclosure for the working principle and process of this embodiment, which will not be elaborated here.

Corresponding to the vehicle-mounted interaction content calling control method provided by Embodiment 3 of the present disclosure, Embodiment 4 of the present disclosure further provides a vehicle-mounted interaction content calling control system, including: an interaction engine and an interaction content calling device, where the interaction engine is configured to: receive an interaction content calling request, and query a corresponding relation between an interaction content stored by interaction engine and an interaction content calling device in response to the interaction content calling request and according to interaction content ID included in the interaction content calling request to obtain one or more interaction content calling devices corresponding to the interaction content, and an address of the interaction content, and to send the address of the interaction content to the interaction content calling device; and the interaction content calling device is configured to send a request for calling interaction content to a device providing the interaction content used according to the address of the interaction content, and to exhibit the interaction content after obtaining the interaction content.

Further, the interaction engine records and modifies the corresponding relation between the interaction content and the interaction content calling device through an editable script file, and the script file is sent to the interaction engine through a communication link of vehicle cloud after being edited in the cloud.

Further, the address of the interaction content refers to an address where the interaction content is stored or an address of a device providing the interaction content in a vehicle-mounted environment.

Further, the interaction engine further stores an interaction specification, and the interaction specification is specifically a standard that specifies how the interaction content is exhibited on the interaction content calling device.

Further, the interaction engine is further configured to obtain the interaction specification for the interaction content calling device to exhibit the interaction content, and to send the interaction specification to the interaction content calling device; and the interaction content calling device is further configured to exhibit the interaction content according to the interaction specification after obtaining the interaction content.

Refer to the description of Embodiment 1 of the present disclosure for the working principle and process of this embodiment, which will not be elaborated here.

Embodiment 5 of the present disclosure further provides a computer-readable storage medium. The computer-readable storage medium includes a stored computer program, where when running, the computer program controls a device where the computer-readable storage medium is located to perform the vehicle-mounted interaction content calling control method according to Embodiment 1 or Embodiment 3.

Preferably, the computer program may be divided into one or more modules/units (such as a computer program 1, a computer program 2, . . . ), and the one or more modules/units are stored in the memory and are performed by the processor to complete the present disclosure. The one or more modules/units may a series of computer program instruction segments capable of completing a specific function, and the instruction segments are configured to describe the execution process of the computer program in the apparatus.

The processor may be a central processing unit (CPU), or may be other general-purpose processors, digital signal processors (DSP), application specific integrated circuits (ASIC), field-programmable gate arrays (FPGA), or other programmable logic devices, discrete gates or transistor logic devices and discrete hardware assemblies. The general-purpose processor may be a microprocessor, or the processor may be any conventional processor, and the processor is a control center of the apparatus and is connected to each part of various interfaces and circuits.

The memory mainly includes a program storage area and a data storage area, where the program storage area may store an application program required by an operating system and at least one function, and the data storage area may store related data. In addition, the memory may be a high-speed random memory, or may be a nonvolatile memory, for example, a plug-in hard disk, a smart media card (SMC), a secure digital (SD) card and a flash card, or the memory may be other volatile solid-state storage devices.

It should be noted that the apparatus may include but is not limited to a processor and a memory, which may be understood by those skilled in the art.

It can be known from the above description, the present disclosure has the following beneficial effects: according to the present disclosure, an interaction content provider and an interaction content caller are decoupled through the design of the interaction engine; when it is necessary to call the interaction content, the interaction engine can send the address of the interaction content to the interaction content calling device corresponding to the interaction content as long as the interaction engine stores the corresponding relation between the interaction content and the interaction content calling device, the interaction content calling device obtains and exhibits the interaction content according to the address of the interaction content, and it is unnecessary to perform separate software development on the interaction content calling device, so that the software development workload in the interaction field is greatly reduced, the interaction content can be rapidly exhibited and shared on a plurality of the interaction devices, and the development and working efficiency of the human-vehicle interaction design of the whole vehicle is improved;

according to the present disclosure, the corresponding relation between the interaction content and the interaction content calling device is adjusted by modifying the script file, so that in the whole vehicle development stage, interaction development can be rapidly completed by modifying the script file, and different vehicle modes can rapidly form completely different interaction styles; and in the vehicle use stage, the interaction model of the vehicle can be rapidly changed by modifying the script file, so that the user experience is improved.

The above is only a preferred embodiment of the present disclosure, which certainly cannot be configured to limit the scope of the claims of the present disclosure. Therefore, an equivalent change made according to the claims of the present disclosure should still be included in the scope of the present disclosure.

The invention claimed is:

1. A vehicle-mounted interaction content calling control method, executed by mutual interaction of components of a vehicle comprising an interaction engine and one or more interaction content calling devices, comprising:
   Step S11: receiving, by the interaction engine, an interaction content calling request, and querying a corresponding relation between an interaction content stored by the interaction engine and the interaction content calling device in response to the interaction content calling request and according to interaction content ID comprised in the interaction content calling request to obtain one or more interaction content calling devices corresponding to the interaction content, and an address of the interaction content; and
   Step S12: sending, by the interaction engine, the address of the interaction content to the interaction content calling device for the interaction content calling device to obtain and exhibit the interaction content according to the address of the interaction content.

2. The vehicle-mounted interaction content calling control method according to claim 1, wherein the interaction engine records and modifies the corresponding relation between the interaction content and the interaction content calling device through an editable script file, and the editable script file is sent to the interaction engine through a communication link of vehicle cloud after being edited in the cloud.

3. The vehicle-mounted interaction content calling control method according to claim 1, wherein the address of the interaction content refers to an address where the interaction content is stored or an address of a device providing the interaction content in a vehicle-mounted environment.

4. The vehicle-mounted interaction content calling control method according to claim 1, wherein the interaction engine further stores an interaction specification, and the interaction specification is specifically a standard that specifies how the interaction content is exhibited on the interaction content calling device.

5. The vehicle-mounted interaction content calling control method according to claim 4, wherein:
   Step S11 further comprises: obtaining, by the interaction engine, the interaction specification for the interaction content calling device to exhibit the interaction content; and
   Step S12 further comprises: sending, by the interaction engine, the interaction specification to the interaction content calling device for the interaction content calling device to exhibit the interaction content according to the interaction specification after obtaining the interaction content.

6. The vehicle-mounted interaction content calling control method according to claim 4, wherein the interaction specification further stores:
an interaction content parameter, configured to further determine a specific range of the interaction content; and
a personalized customization parameter, used for a user to customize how to exhibit the interaction content, or for a vehicle-mounted interaction application program to determine how to exhibit the interaction content according to service logic.

7. The vehicle-mounted interaction content calling control method according to claim 4, wherein the interaction specification further is configured with priority levels of different interaction contents; and after the interaction content calling device obtains to-be-exhibited interaction content, the interaction content with a higher priority level is preferentially exhibited based on comparison between a priority level configured by the interaction specification and a priority level of currently exhibited interaction content.

8. A vehicle-mounted interaction content calling control method, executed by mutual interaction of components of a vehicle comprising an interaction engine and one or more interaction content calling devices, comprising:
Step S21: receiving, by the interaction engine, an interaction content calling request, and querying a corresponding relation between an interaction content stored by the interaction engine and the interaction content calling device in response to the interaction content calling request and according to interaction content ID comprised in the interaction content calling request to obtain one or more interaction content calling devices corresponding to the interaction content, and an address of the interaction content;
Step S22: sending, by the interaction engine, the address of the interaction content to the interaction content calling device; and
Step S23: sending, by the interaction content calling device, a request for calling interaction content to a device providing the interaction content according to the address of the interaction content, and exhibiting the interaction content after obtaining the interaction content.

9. The vehicle-mounted interaction content calling control method according to claim 8, wherein the interaction engine records and modifies the corresponding relation between the interaction content and the interaction content calling device through an editable script file, and the editable script file is sent to the interaction engine through a communication link of vehicle cloud after being edited in the cloud.

10. The vehicle-mounted interaction content calling control method according to claim 8, wherein the address of the interaction content refers to an address where the interaction content is stored or an address of a device providing the interaction content in a vehicle-mounted environment.

11. The vehicle-mounted interaction content calling control method according to claim 8, wherein the interaction engine further stores an interaction specification, and the interaction specification is specifically a standard that specifies how the interaction content is exhibited on the interaction content calling device.

12. The vehicle-mounted interaction content calling control method according to claim 11, wherein:
Step S21 further comprises: obtaining, by the interaction engine, the interaction specification for the interaction content calling device to exhibit the interaction content;
Step S22 further comprises: sending, by the interaction engine, the interaction specification to the interaction content calling device; and
Step S23 further comprises: exhibiting, by the interaction content calling device, the interaction content according to the interaction specification after obtaining the interaction content.

13. A non-transitory computer-readable storage medium having stored therein instructions that, when executed by a processor of a terminal, causes the terminal to perform a vehicle-mounted interaction content calling control method, executed by mutual interaction of components of a vehicle comprising an interaction engine and one or more interaction content calling devices, wherein the vehicle-mounted interaction content calling control method comprises:
receiving the interaction content calling request, and query a corresponding relation between an interaction content stored by interaction engine and the interaction content calling device in response to the interaction content calling request and according to interaction content ID comprised in the interaction content calling request to obtain one or more interaction content calling devices corresponding to the interaction content, and an address of the interaction content, and to send the address of the interaction content to the interaction content calling device; and
sending a request for calling interaction content to a device providing the interaction content used according to the address of the interaction content, and to exhibit the interaction content after obtaining the interaction content.

14. The non-transitory computer-readable storage medium according to claim 13, wherein the interaction engine records and modifies the corresponding relation between the interaction content and the interaction content calling device through an editable script file, and the editable script file is sent to the interaction engine through a communication link of vehicle cloud after being edited in the cloud.

15. The non-transitory computer-readable storage medium according to claim 13, wherein the address of the interaction content refers to an address where the interaction content is stored or an address of a device providing the interaction content in a vehicle-mounted environment.

16. The non-transitory computer-readable storage medium according to claim 15, wherein the interaction engine further stores an interaction specification, and the interaction specification is specifically a standard that specifies how the interaction content is exhibited on the interaction content calling device.

17. The non-transitory computer-readable storage medium according to claim 16, wherein:
the interaction engine is further configured to obtain the interaction specification for the interaction content calling device to exhibit the interaction content, and to send the interaction specification to the interaction content calling device; and
the interaction content calling device is further configured to exhibit the interaction content according to the interaction specification after obtaining the interaction content.

* * * * *